Patented Mar. 5, 1940

2,192,285

UNITED STATES PATENT OFFICE 2,192,285

SUBSTANCE CONTAINING GOLD AND METHODS OF PRODUCING THE SAME

Fritz Feigl, Vienna, Austria, assignor to Interpublic A.-G., Zurich, Switzerland, a corporation of Switzerland No Drawing. Application May 2, 1936, Serial No. 77,615. In Austria May 3, 1935

6 Claims. (Cl. 167—14)

This invention relates to novel gold-containing products and methods of manufacturing the same. The products according to the invention are particularly well suited for therapeutic, disinfecting, sterilizing, activating, and other technical purposes, by reason of their specific efficiency.

The products according to the present invention contain gold in an effective form, and preferably jointly with or on further substances of an active nature such as oxidizing substances, the present novel method of manufacture yielding invariably products in which the active components are present in a perfectly homogeneous and extremely finely divided state. Further, the new method of manufacture according to my invention makes it possible to impregnate a large variety of carrier substances with the active gold product or a mixture thereof with oxid'c metallic compounds which yield oxygen, and that with the attainment of a high degree of uniformity and in a simple and economic manner. In addition to their valuable therapeutic, disinfecting, and sterilizing properties, the products according to the invention are also suitable for many technical and industrial purposes, for example for catalyzing reactions in which gold is effective as a catalyst, and in which the oxygen-yielding metallic oxide (for example manganese dioxide) contained in the product cancels the deterrent effect of various substances (such as $H_2S$, $AsH_3$, S, and the like) which are prejudicial to the catalyzing action.

The process according to the present invention consists in subjecting gold compounds in which the gold is preferably combined in an ionogenous form, that is to say in a form in which it is capable of reacting, together with metallic compounds which are capable of forming oxides, hydroxides, or basic salts in a number of valences, under the action of compounds which yield hydroxyl ions, preferably in an aqueous medium. The hydroxyl ions can be supplied by the addition of alkalinely reacting substances of any kind, such as for instance fixed alkalies, ammonia, alkaline silicates, organic bases and their carbonates, but also by the employment of oxides, hydroxides, or basic salts of gold participating in the reaction or of the metals themselves which occur in a number of valences. For example, there are suitable for the carrying out of the manufacturing process according to the invention manganous, cobaltous, ferrous, and cerous salts on the one hand, and gold compounds, for example gold chloride or chlorauric acid, on the other hand. When these substances react in an alkaline medium there result bulky but well filterable and readily washed out precipitates which consist of extremely finely divided gold and the higher valency oxides or hydroxides of the polyvalent metals used.

The conversion proceeds for example according to the following reaction mechanism:

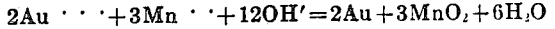
$$2Au^{\cdots}+3Mn^{\cdot\cdot}+12OH'=2Au+3MnO_2+6H_2O$$

A feature of essential significance is to be found in the fact that the homogeneous products consisting in accordance with the invention of gold and a higher valency, difficulty soluble metal oxide or metal hydroxide are capable of exerting an excellent activating effect on the disinfecting, therapeutical, and sterilizing properties of other metals and metallic compounds, and notably of substances containing silver. This activating effect is very considerably higher than when gold is mechanically admixed with a metal or metal compound of known disinfecting action.

In accordance with the present invention, more particularly mixtures of reaction products containing gold, produced in the above described manner, with silver-containing products produced in an alkaline medium by the action of silver ion yielding compounds, for example silver salts, on metallic compounds of multivalent metals, a compound of a metal present as cation being employed in a lower valency, show particularly pronounced disinfecting, sterilizing, or therapeutical action. The efficacy of such mixtures, in which for example the amount of gold present is only one-tenth of the amount of silver present, is far higher than that of products containing either silver or gold alone in the same quantity, that is to say in equal quantities, and is even higher than that of products containing gold in as large a quantity as that of the silver contained in the said products containing both silver and gold.

In the production of such highly active products it is particularly advantageous to react silver and gold ion yielding compounds, for instance silver salts and gold salts, jointly in an alkaline medium with metallic compounds of metals which are capable of existing in a plurality of valences, with the employment in a lower valency of a compound of a metal present as cation. For this purpose there can be employed as silver and gold ion supplying compound for example the silver salt of chlorauric acid.

The described conversions should take place in the absence of such compounds as are capable of forming soluble complex salts with the said metallic compounds capable of existing in a plurality of valences.

Very particular advantages are provided by one form of the process according to the invention, which consists in depositing the substances produced in accordance with the invention, during their evolution, directly upon carrier substances of a large variety of kinds.

As carrier substances there may serve, for instance in the production of disinfectant and even permanently sterile dressing and wound treating material, fibrous matter of all kinds such as textile fibres, cotton, fabric, and paper; further, there can also be employed as carriers, substances such as animal charcoal, silica gels, bole, and other pulverulent substances which are themselves innocuous for the purpose in view, and which are at the same time capable themselves of serving as yielders of hydroxyl ions. This can be effected either by a preliminary treatment of the carier material with substances of alkaline reaction, for example by steeping, spraying, or the like, or by the employment, as carriers, of substances which themselves have sufficient alkaline reaction, such as for example carbonates of the alkaline earths, oxides such as MgO, ZnO, and the like. In all these cases it is sufficient to treat such carrier material preferably with a solution of the starting materials, and then to wash out any surplus of these substances.

In many cases it is advantageous to cause the reaction to proceed in the presence of protective colloids such as for example albuminous substances, vegetable mucilage, lecithins, and the like. In this manner it becomes possible to produce colloidal solutions or extremely fine suspensions of the reaction products which prove efficacious as active substances for the treatment of various infectious diseases, for example gonorrhea.

As carrier substances there can of course also be used substances (for example animal charcoal) which are themselves therapeutically active. The substances according to the present invention can likewise be evolved in the presence of further therapeutically active substances known per se, whereby in many cases there are again obtained products having properties far superior to those of mere mixtures of the supplementary substances with the finished reaction products according to the present invention.

The new products are also particularly well suited for the preparation of ointments, for which purpose the active gold or gold-silver and metallic oxide mixture is made up with any suitable unguent base.

With the employment of the process according to the invention the quantity of the resulting reaction products, such as for example gold and higher valency metallic oxide, can be accurately predetermined by apportionment of the quantity of the substance used for supplying hydroxyl ions. It is possible for example to preliminarily impregnate a carrier material to be treated, such as fibrous matter including fabric, with a measured quantity of alkali. If this fibrous material be then caused to react for example with the solution of a mixture of chlorauric acid and manganous chloride, there will be deposited upon the fibrous material only that quantity of gold and manganese dioxide which is equivalent to the alkali used, as determined by the equation

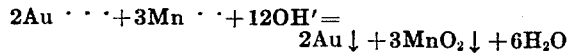

The order of admixture, as also the quantitative proportions of the individual reaction components used, can also, however, be varied to suit the purpose in view at any one time, that is to say it is possible, for example, first to steep the carrier material in solutions of liquids containing mangano ions and gold ions, and then to render the whole alkaline. The same applies when use is made of other metallic compounds (metal salts) of metals which are capable of existing in a plurality of valences.

The following examples are not to be considered as exclusive, and I do not limit myself to the precise conditions or proportions set forth, as they can be varied by those skilled in the art, to suit varying conditions and purposes.

*Examples*

(1) A solution of 8.25 grams of chlorauric acid and 8.6 grams of manganese nitrate hydrate in 200 ccs. of water is given the addition of an excess of caustic soda solution. The precipitate is filtered under suction, repeatedly washed with water, and dried. This precipitate represents a black powder of the following composition: 2Au3MnO₂, in which the gold is present with the quadrivalent manganese oxide in a state of perfectly homogeneous distribution.

(2) To a solution of 8.25 grams of chlorauric acid and 19.5 grams of cerous nitrate in 500 ccs. of water there is added an excess of caustic potash solution. The precipitate is filtered under suction, the surplus lye removed by washing with water, and the product dried. This product is a black powder of the formula Au3CeO₂.

(3) To a solution of 34 grams of silver nitrate and 37.5 grams of manganese nitrate hydrate in a liter of water there is added a solution of 8.25 grams of chlorauric acid in 100 ccs. of water. A yellowish precipitate is at once formed, consisting of the silver salt of chlorauric acid. An excess of caustic soda solution is then added, after which the mixture is left to stand for some time while being agitated. The precipitate is then filtered off under suction, washed with water, and dried.

(4) Into a solution of 8.25 grams of gold chloride and 8.6 grams of manganese nitrate hydrate in 500 ccs. of water there is introduced 50 grams of precipitated calcium carbonate, and the suspension kept at boiling for some time. The dark grey to black powder is filtered off under suction, thoroughly washed with water, and dried.

(5) 10 grams of gauze are dipped into a solution of 0.83 gram of chlorauric acid and 0.86 gram of manganese nitrate in 50 ccs. of water. The gauze is then expressed, and introduced into 500 ccs. of a 4% caustic soda solution. The gauze is then thoroughly washed and dried.

(6) 75 grams of gauze are slowly dipped into a solution of 0.83 gram of chlorauric acid and 0.86 gram of manganese nitrate in 400 ccs. of water. The expressed gauze is then dipped in a 4% caustic soda solution, and washed out. The gauze is then immersed in a solution of 1.7 grams of silver nitrate and 1.45 grams of manganese nitrate hydrate in 500 ccs. of water, expressed, once more bathed in lye, washed, and dried.

(7) 200 grams of gauze are dipped in a solution of 0.42 gram of chlorauric acid and 0.43 gram of manganese nitrate hydrate in a liter of water. The expressed gauze is then immersed in a solution of 3.4 grams of silver nitrate and 2.9 grams of manganese nitrate hydrate in a liter of water, expressed, and introduced into two liters of a 2% caustic soda solution. The gauze is then freed from the surplus alkali by washing with water, and dried.

(8) 200 grams of gauze are dipped in a solution of 6.4 grams of silver nitrate and 5.8 grams of manganese nitrate hydrate in a liter of water. The expressed gauze is immersed in a lye bath, washed, and dried. The gauze is then introduced into a solution of 0.83 gram of chloriauric acid and 0.86 gram of manganese nitrate hydrate in a liter of water, expressed, once more immersed in a lye bath, washed, and dried.

(9) 50 grams of gelatine are dissolved in 2.5 liters of water, boiled for several minutes, and after cooling off admixed with a solution of 34 grams of silver nitrate and 37.5 grams of manganese nitrate. There is then carefully added, with stirring, a solution of 8.25 grams of chloriauric acid in 500 ccs. of water. The silver salt of chloriauric acid formed remains in a colloidal state in solution. A 2% caustic soda solution is then added, under constant stirring, until the solution is of definitely alkaline reaction. For the purpose of removing admixtures of electrolyte the solution is then placed in parchment containers and dialized with water for several days. An intensely black liquid of almost neutral reaction is obtained in this manner.

In place of manganese nitrate it will be clear that other manganous salts, and in place of manganese salts other compounds of metals which are capable of existing in a plurality of valences, and in which the metal is present in a lower valency as cation, for example ferrous salts, cobaltous, nickelous compounds, and the like, can be employed. It is also to be noted that these compounds are compounds of metals having a higher solution tension than hydrogen.

The products according to the invention are also admirably well suited for the sterilizing and preserving of various substances, for example liquid such as fruit juices, and more particularly non-sterile water. Liquids can be rendered practically perfectly sterile by being caused to flow over a filter mass made from the described reaction products, and preferably deposited on to a porous carrier material or base. It is further advantageous to impregnate the inner walls of storage vessels and containers with the reaction products according to the invention, or to place liners impregnated in this manner into other vessels and containers.

For the storage and transportation of fruit or other material or goods liable to spoil, packing material such as wood wool, saw-dust, cork meal, and the like impregnated or intermixed with products according to the invention are admirably suited.

I claim:

1. A new composition of matter for therapeutical, disinfectant, and sterilizing purposes, consisting of a homogeneous mixture of extremely finely divided metallic gold, metallic silver, and a higher valency compound of a metal capable of existing in a plurality of valencies and of a higher solution tension than hydrogen, said compound being selected from the group consisting of oxides and hydroxides.

2. A new composition of matter for therapeutical, disinfectant, and sterilizing purposes, as claimed in claim 1, in which the silver content of the mixture is at least twice the gold content thereof.

3. A method of preparing a composition containing gold for therapeutical, disinfectant, sterilizing and/or activating purposes, in which compounds yielding silver ions and compounds yielding gold ions are jointly reacted, in an alkaline medium, with metallic compounds of metals capable of existing in a plurality of valencies and of a higher solution tension than hydrogen, a compound of a metal present as cation being employed in a lower valency, the reaction being caused to proceed in the presence of a protective colloid, and depositing the reaction products in the course of their formation onto an alkaline carrier substance.

4. As a new article of manufacture for therapeutical, disinfectant, sterilizing, and/or activating purposes, a carrier substance uniformly impregnated with a homogeneous mixture of extremely finely divided metallic gold, metallic silver, and a higher valency compound of a different metal capable of existing in a plurality of valencies and of a higher solution tension than hydrogen, said compound being selected from the group consisting of oxides and hydroxides, the stated compounds being present in molecular admixture in constant stoichiometric ratio.

5. The method of making disinfectant, therapeutic and sterilizing substances which contain gold and silver which comprises precipitating the silver salt of chlorauric acid on a carrier and subsequently converting it with a compound of a metal which has a higher solution tension than hydrogen, is capable of existence in several valencies, and occurs in the compound as cation in a lower valency, together with an alkaline reacting substance.

6. A new composition of matter for therapeutical, dsinfectant and sterilizing purposes consisting of a homogeneous mixture of extremely finely divided metallic gold, and metallic silver, together with a metallic oxide selected from the group consisting of the following: $MnO_2$, $Fe_2O_3$, $CeO_2$, $Co_2O_3$, and $NiO_2$.

FRITZ FEIGL.